United States Patent [19]
Grosse

[11] Patent Number: 6,144,923
[45] Date of Patent: Nov. 7, 2000

[54] MACHINE DIAGNOSIS SYSTEM

[75] Inventor: Gilbert Grosse, Heidenheim, Germany

[73] Assignee: Voith Hydro, GmbH & Co KG, Germany

[21] Appl. No.: 09/019,619

[22] Filed: Feb. 6, 1998

[30] Foreign Application Priority Data

Feb. 22, 1997 [DE] Germany .................. 197 07 173

[51] Int. Cl.[7] .................................................. G01F 17/00
[52] U.S. Cl. .......................... 702/56; 702/179; 702/185; 700/159; 700/169
[58] Field of Search ............................. 714/25; 700/159, 700/169; 702/179, 185, 56; 73/659

[56] References Cited

U.S. PATENT DOCUMENTS

| | | | |
|---|---|---|---|
| 4,425,798 | 1/1984 | Nagai et al. ........................ | 73/659 |
| 4,812,976 | 3/1989 | Lundy ................................ | 364/413.06 |
| 4,985,857 | 1/1991 | Bajpai et al. . | |
| 4,989,159 | 1/1991 | Liszka et al. ..................... | 364/508 |
| 5,210,704 | 5/1993 | Husseiny ........................... | 364/551.01 |
| 5,251,151 | 10/1993 | Demjanenko et al. ........... | 364/550 |
| 5,566,092 | 10/1996 | Wang et al. ....................... | 364/551.02 |
| 5,594,175 | 1/1997 | Lyon et al. ........................ | 73/593 |
| 5,602,761 | 2/1997 | Spoerre et al. ................... | 364/554 |
| 5,661,668 | 8/1997 | Yemini et al. .................... | 364/550 |
| 5,710,715 | 1/1998 | Shitanda .......................... | 364/508 |
| 5,943,634 | 8/1999 | Piety et al. ....................... | 702/56 |

OTHER PUBLICATIONS

Kay, Steven M. and Marple, Stanley Lawrence, Spectrum Analysis—A Modern Perspective, Proceedings of the IEEE, Nov., 1981, 1380–1419.

Voith Group of Companies—Voith Hydro Turbine Group—*Dimensions and Illustrations*, Jul. 1995 (1 Page, double sided—English language on one side, German language on the other side).

*Primary Examiner*—Ly V. Hua
*Assistant Examiner*—Robert G. Crockett
*Attorney, Agent, or Firm*—Foley & Lardner

[57] ABSTRACT

The invention, that relates to a machine diagnosis system for the state-oriented operation monitoring of a machine, comprises a characteristic value module and a cause module. The characteristic value module, proceeding from machine-state referred measurement values, establishes diagnosis-relevant characteristic values, and the cause module diagnoses from the characteristic values a cause for the detected measurement values. There the cause module calculates for at least one possible cause in each case a cause probability which indicates with what probability the corresponding cause is responsible for the presence of the detected oscillation measurement values.

32 Claims, 4 Drawing Sheets

MACHINE DIAGNOSIS SYSTEM

FIELD OF THE INVENTION

The invention relates to a machine diagnosis system for the state-oriented operation monitoring of a machine with a characteristic value module which, proceeding from machine state-related measurement values forms diagnosis-relevant characteristic values and with a cause module which diagnoses from the characteristic values a cause for the detected oscillation measurement values, and to a process for the execution of a corresponding machine diagnosis.

BACKGROUND OF THE INVENTION

Such a machine diagnosis system carrying out a diagnosis of the oscillation state of water power machines is known from the firm publication t 2981 7.95 of the firm of Voith. Thereby impending damages can be perceived early and the manner of operation of the machine can be optimized. Rudiments for a computer-supported machine diagnosis system were presented by other manufacturers of monitoring arrangements. It was a matter there, however, either of simple mathematical analysis of the signals or there was presumed a definition of oscillation patterns not feasible in actual practice.

The problem of the invention, therefore, is to make available a machine diagnosis system with which the diagnosis expenditure is reduced and the dependability of the diagnosis is improved.

SUMMARY OF THE INVENTION

This problem is solved according to the invention by the means that the cause module for at least one possible cause calculates in each case a cause probability which indicates with what probability the corresponding cause is responsible for the presence of the detected measurement values.

Thereby the diagnosis can proceed from a surveyable number of possible causes for the detected measurement values and the diagnosis expenditure can thus be kept within practicable limits.

If the cause module for the calculation of the cause probability, besides individual characteristic values, draws upon at least one characteristic value linkage, the accuracy and dependability of the diagnosis can be increased, since through the use of characteristic value linkages there can also be taken into account the influence of cross-linked causal interconnections between characteristic values among one another and actual machine state.

There has already been computed a cause module which detects the cause probability as a weighted arithmetic mean of individual probabilities, in which the individual probabilities are allocated to individual characteristic values or characteristic value linkages and are weighted for mean value formation with individual weighting factors. In this manner there can enter into the decision as to whether a certain cause is present, not only the characteristic value most obviously associated with this cause, but also the influence of further characteristic values or characteristic value linkages.

In the event that the individual weighting factors are characteristic value-influenced, the cause probability calculation is so flexible that only with the presence of possibilities opening up the presence of intermediate results can possibilities plausibility checking still be perceived by the cause module.

The characteristic value module forms characteristic values dependent on operating parameters, in which operating parameters are measurement values referred to type of operation. The cause module makes use of the dependence of the characteristic values or characteristic value linkages on the operating parameters for the calculation of the cause probability. Underlying this measure there lies the insight that the representation of the measurement values as a function of time is only slightly informative, since the multiplicity of parameters that influence the machine behavior is mixed in this representation. There the characteristic values or characteristic value linkages can be time-dependent, in which case the characteristic value module allocates the characteristic values or characteristic value linkages to certain operating parameter intervals and mediates them in time, in order to form operating parameter histograms. Thereby the interrelations between characteristic values and oscillation causes can be especially differentiated and exactly detected, in which process a special trend analysis can evaluate the dependence of the operating parameters as also on time.

It has proved that the machine diagnosis system of the invention is suited especially for rotating machines and especially for hydraulic flow machines, for example turbines.

For such machines, for example, the spectral components of the shaft oscillations, the orbit characteristics of the shaft oscillations and the phase angles of the shaft oscillation are significant and diagnosis-relevant characteristic values. There it is advantageous for the diagnosis success to take into account the dependence of these or of further characteristic values on an operating parameter which indicates whether a pump operation, a turbine operation, a phase shifter operation, a starting of the machine, or a running-out of the machine is present. Furthermore, however, there have also proved useful the operating parameters (such as) momentary performance of the machine, suction tube pressure, pipe course pressure, guide wheel position and drop height for a hydraulic flow machine.

A warning module integrated into the diagnosis system also gives to the machine operator—in the presence of a certain cause probability or of a certain distribution of cause probabilities—besides the warning, the probability for the existing fault, so that this operator can take suitable steps on his own responsibility or, in the case of unusual circumstances known to him, can ignore the warning.

In addition, or alternatively, an example of execution of the machine diagnosis system, however, can also comprise a reaction module which, in the presence of a certain cause probability or of a certain distribution of cause probabilities, can intervene in the operation of the machine. Such an incursion can be for example a power limit, a load change, or a machine stoppage. Hereby an automatic system is made available, largely precluding a human failing as source of error.

The calculation of the cause probability by the cause module or the formation of the characteristic values by the characteristic value module proceeds from a knowledge-basis which comprises machine-individual experience knowledge and a theoretical machine model. Thereby all experiences or existing knowledge gained by the manufacturer and/or machine operator are utilized. In view of a training phase accompanying the operating of the machine in the machine diagnosis system, it is advantageous there if the knowledge basis is extensible and/or modifiable on the part of the machine operator.

Further, the invention comprises the process according to claims 17 to 32.

BRIEF DESCRIPTION OF THE DRAWINGS

The invention is explained in the following with the aid of forms of execution with reference to the attached figures, in which.

DETAILED DESCRIPTION OF A PREFERRED EXEMPLARY EMBODIMENT

Figure 1:
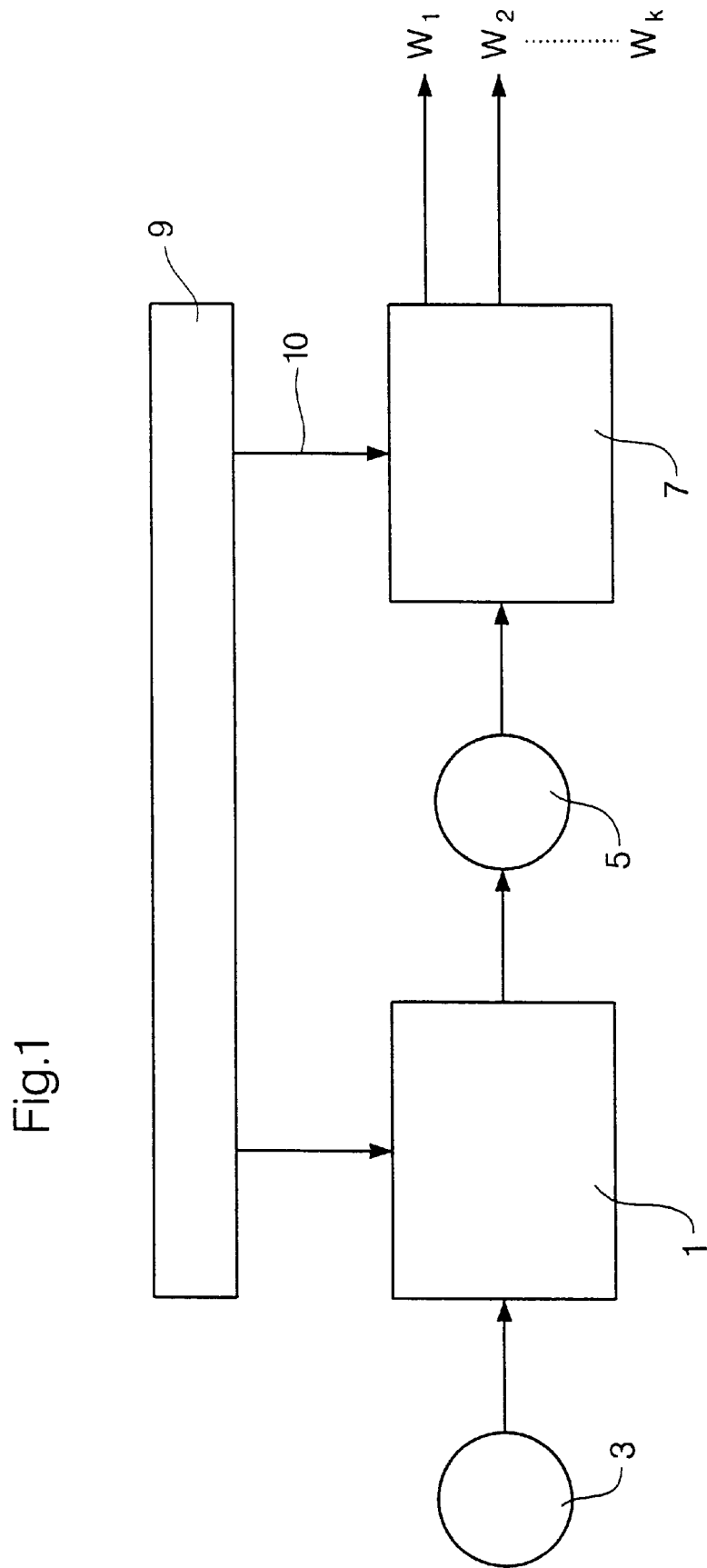
FIG. 1 shows a schematic representation of a form of execution of the machine diagnosis system according to the invention.

The schematic representation of the machine diagnosis system according to the invention in FIG. 1 shows a characteristic value module 1 which establishes diagnosis-relevant characteristic values 5 from measurement values 3 detected on a machine. A cause module 7 calculates successively from these characteristic values 5 a series of cause probabilities $W_1, W_2, \ldots W_k$. The cause probability $W_1, W_2$ or $W_k$ is the probability the cause 1, 2 or k that underlies the measurement values 3.

FIG. 1 shows a form of execution in which the characteristic module 1 establishes the characteristic values 5 with the aid of a knowledge basis 9. The knowledge-basis 9 in the form of execution according to FIG. 1, however, underlies also the calculation of the cause probabilities $W_1, W_2, \ldots W_k$ and it also comprises, besides machine-individual experience knowledge of the machine manufacturer and possibly of the machine operator, a theoretical machine model, whereby the diagnosis relevance of the characteristic values can depend also on the quality of the theoretical modeling of the machine.

The invention, however, is not restricted to the form of execution schematically represented in FIG. 1. Thus the formation of the characteristic values 5 or the calculation of the cause probabilities $W_1, W_2, \ldots W_k$ also can occur without resort to the knowledge-basis 9. What is essential is the formation of machine-dependent, easily handleable, diagnosis-relevant characteristic values 5 from the primary measurement values 3. The characteristic values 5 can thereby be formed in such manner that they are symptomatic or characteristic for one or several definite causes. Also thereby the diagnosis expenditure can be kept within practicable limits with great certainty and dependability.

With use of the machine diagnosis system of the invention for oscillation diagnosis in rotating water power machines, the measurement values 3 can comprise relative shaft oscillations measured at different points of the machine shaft of the water power installation. Further measurement values in this case can be the turning rate of the shaft, the effective or idle power, the suction pipe pressure, the pipeline pressure or the guide wheel position. The characteristic values 5 formed from such measurement values 3 may include, for example, the spectral constituents of the shaft oscillations, such as, for example the turning rate harmonic, the turning rate subharmonic or also the turning rate interharmonic spectral constituents. Besides these, it has proved that also the orbit characteristic of the shaft oscillations is a diagnosis-relevant characteristic value. To this there belongs, for example, the main axle relation and the orientation or the ellipse allocated to the first turning-rate harmonic constituent of the shaft oscillations. Also the relative alignment of such ellipses at different measuring sites of the shaft are possible characteristic values. Further examples for characteristic values also are the phase angle also for the higher harmonic constituents of the oscillations, precession movements, or also standard deviations, time mean values, or peak values of such magnitudes.

Selection and type for the determination of these characteristic values can be established in the conceptual knowledge-basis 9. Also, the cause module 7 can be based on such expert knowledge stored in the knowledge-basis 9.

It has proved that characteristic values 5 formed from the direct or also pre-analyzed measurement values 3 for certain oscillation causes can be far more characteristic than these measurement values 3 themselves. This experience knowledge, which can be supported and developed by the theoretical modeling of the water power machine, can underlie the cause probability calculation by the cause module 7, which is represented in symbolic manner by the arrow 10 proceeding from the knowledge-basis 9 and ending on the cause module 7. A possible cause of the detected measurement values can be, for example, a coupling error to which according to experience above all of the characteristic value of the first turning-rate harmonic spectral constituent of the shaft oscillation is allocated. The cause of alignment errors, in contrast, can be recognized most clearly on the characteristic value turning-rate dependence of the main axes of the oscillation orbits.

Figure 2:
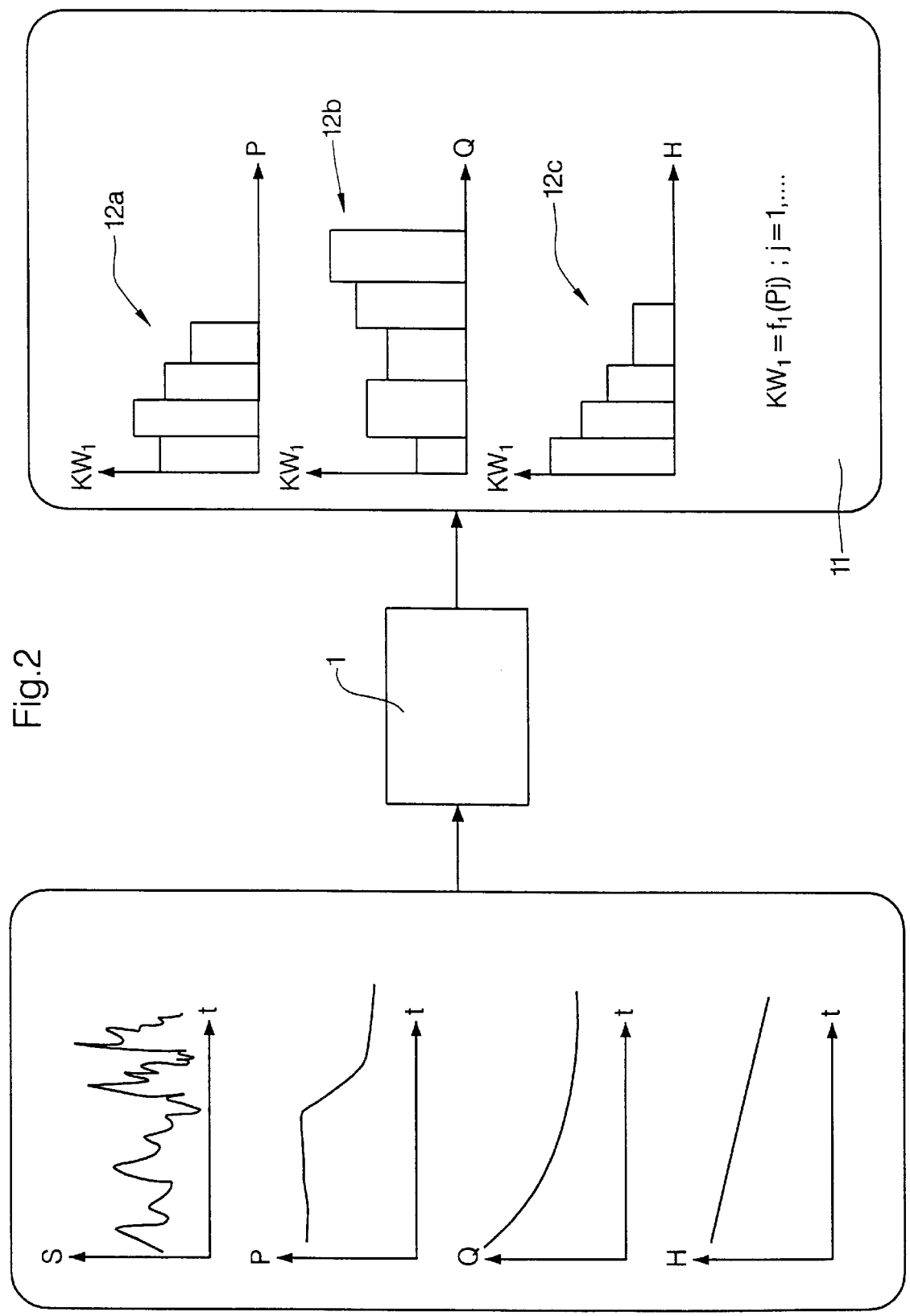
FIG. 2 shows a representation explaining the function of the characteristic value module of FIG. 1.

In FIG. 2 there is represented an especially advantageous characteristic value formation. This characteristic value formation is explained on the basis of an oscillation measurement magnitude S, for example an oscillation amplitude. The oscillation measurement magnitude S is measured time-dependently and is represented in FIG. 2 as an S-t-diagram. Simultaneously with the detection of the measurement value S there are measured magnitudes designated as operating parameter-performance P, flow Q and drop height H. From the measurement value S the characteristic value module 1 establishes the characteristic value $KW_1$, for example the first turning-rate harmonic spectral constituent of the oscillation amplitude. Further diagnosis-relevant characteristic values are formed by the characteristic module 1 by allocation of the characteristic value $KW_1$ to various intervals of the operating parameters P, Q and H. Therewith there are obtained characteristic values which are representable as characteristic value-operating parameter histograms 12a, 12b, 12c, or as functions of the individual operating parameters Pj, for example $KW_1 = f_1(Pj)$, $j = 1, 2, \ldots$ Since by reason of the multiplicity of the parameters which influence the oscillation behavior of the machine the representation of measurement magnitudes—made available by a measuring device and possibly by an analysis system—as a function of time is only slightly informative, it becomes possible by the linkage of the oscillation characteristic values with operating parameters, and possibly by the averaging over different periods of time, for example days, weeks, months etc. a reasonable allocation of the time course of characteristic values to certain operating states. The characteristic values $KW_i$, $i=1 \ldots$ are deposited in a long-time storage 11.

Figure 3:
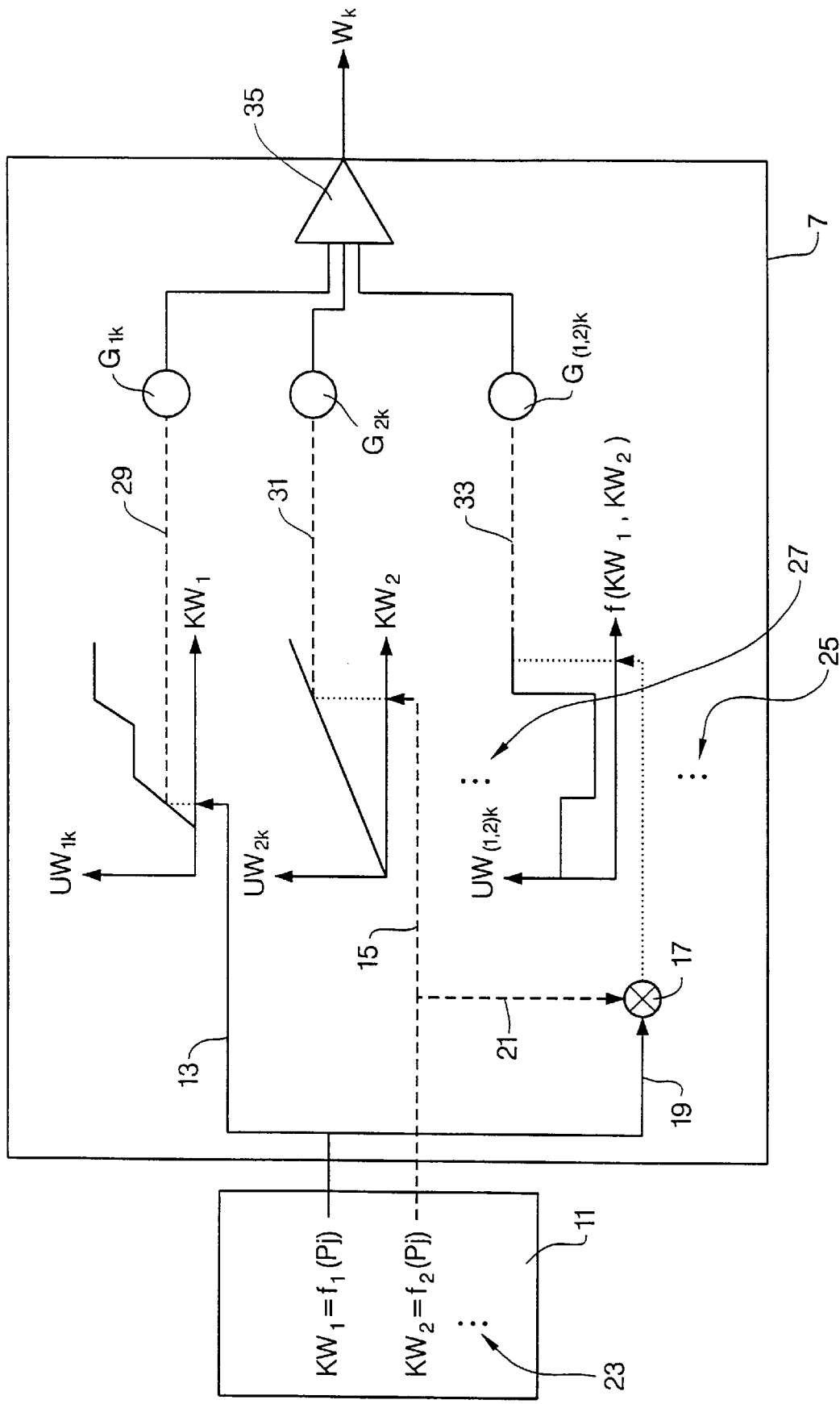
FIG. 3 shows a representation explaining the function of the cause module of FIG. 1.

In FIG. 3 there is schematically represented how the cause module 7 of FIG. 1 calculates the probability $W_k$ for the presence of the cause k from these characteristic values $KW_1, KW_2 \ldots$ stored in the long-time storage 11.

From characteristic values $KW_1$, $KW_1 = f_1(Pj)$ $j = 1, \ldots$, as function of the operating parameters Pj of the characteristic value module 1, the cause module 7 calculates the probability established constituent $uw_{1k}$ allocated to this characteristic value amount $KW_1$, with the aid of a $uw_{1k}$-$KW_1$, relation described by a polygonal course. There, the representation of the $uw_{1k}$-$KW_1$ relation chosen in FIG. 3 as an x-y diagram, is to be understood only symbolically. It is possible, namely, to assign to any of the characteristic values $KW_1$ covered by the function $f_1$ (Pj) to such an x-y diagram with possibly individual polygonal course. The calculation of individual probability constituents $uw_{1k}$ from the characteristic values $KW_1$ is represented by the solid connecting line 13 between $KW_1$ and the $uw_{1k}$-$KW_1$ diagram. In a similar manner the probability constituent $UW_{2k}$ contributing to the cause k, which is due to the characteristic value amount $KW_2=f_2(Pj)$, $Pj=1, \ldots$, is represented by the broken connecting line 15.

A quite especially advantageous form of execution of this invention also considers, for the calculation of the cause probability $W_k$, linkages of characteristic values. Such a linkage, for example, of the characteristic values $KW_1$ and $KW_2$ is represented in FIG. 3 by the linkage symbol 17, into which the solid connecting line 19 proceeding from the characteristic value $KW_1$, and the broken connecting line 21 proceeding from the characteristic value $KW_2$ issue. The linkage symbol 17 can signify any conceivable linkage, for example the amount of the difference of the characteristic values $KW_1$ and $KW_2$: $|KW_1-KW_2|$ or any linkage described by an arbitrary function of two variables $KW_1$ and $KW_2$. Besides this, according to the invention, linkages of more than two characteristic values also are possible.

The numerical value formed by this linkage 17 is used as input magnitude in a $uw_{(1,2)k}$-$f(KW_1,KW^2)$ diagram. There, $uw_{(1,2)k}$ is the share in the probability for the cause k which is due to the characteristic value linkage $f(KW_1, KW_2)$.

The particular form of the polygonal courses represented in FIG. 3 is stored in the knowledge-basis 9 of FIG. 1. It has proved that already by polygonal courses established by merely five number pairs there is made possible a dependable machine diagnosis.

By the point symbols characterized with the reference numbers 23, 25 and 27 in FIG. 3, it is to be expressed that the cause module 7 can use more than only the two probability constituent characteristic values represented, and more than only the one probability constituent characteristic value linkage relation.

From the respective values of the probability constituents $UW_{1k}$, $UW_{2k} \ldots$, $UW_{(1,2)k}$, ... then by multiplication with a corresponding weighting factor $G_{1k}$, $G_{2k}$, ... $G_{(1,2)K}$, and averaging of these weighted probability constituents, there is calculated the cause probability $W_k$. By the broken lines 29, 31 and 33 there is represented the weighting with the weighting factors $G_{1k}$, $G_{2k}$ and $G_{(1,2)k}$. Just as for the probability constituents $uw_{1k}$, the weighting factors $G_{1k}$ can also be dependent on the operating parameters.

The applicant, however, has found that it is advantageous to make the magnitude of the individual weighting factors $G_{1k}$, $G_{2k}$, $G_{(1,2)k}$ ... dependent on the characteristic values themselves. If, for example, as characteristic value there has been formed the scatter of a certain oscillation magnitude, it can be advantageous to give a characteristic value allocated to the mean value of this oscillation magnitude a greater weighting factor with smaller scatter, and a smaller weighting factor with greater scatter. With the aid of the characteristic value dependence of these individual weighting factors, plausibility relations can thus be taken into account.

The formation of the arithmetic mean from the weighted probability constituents is represented in FIG. 3 by the triangle designated with 35.

Figure 4:
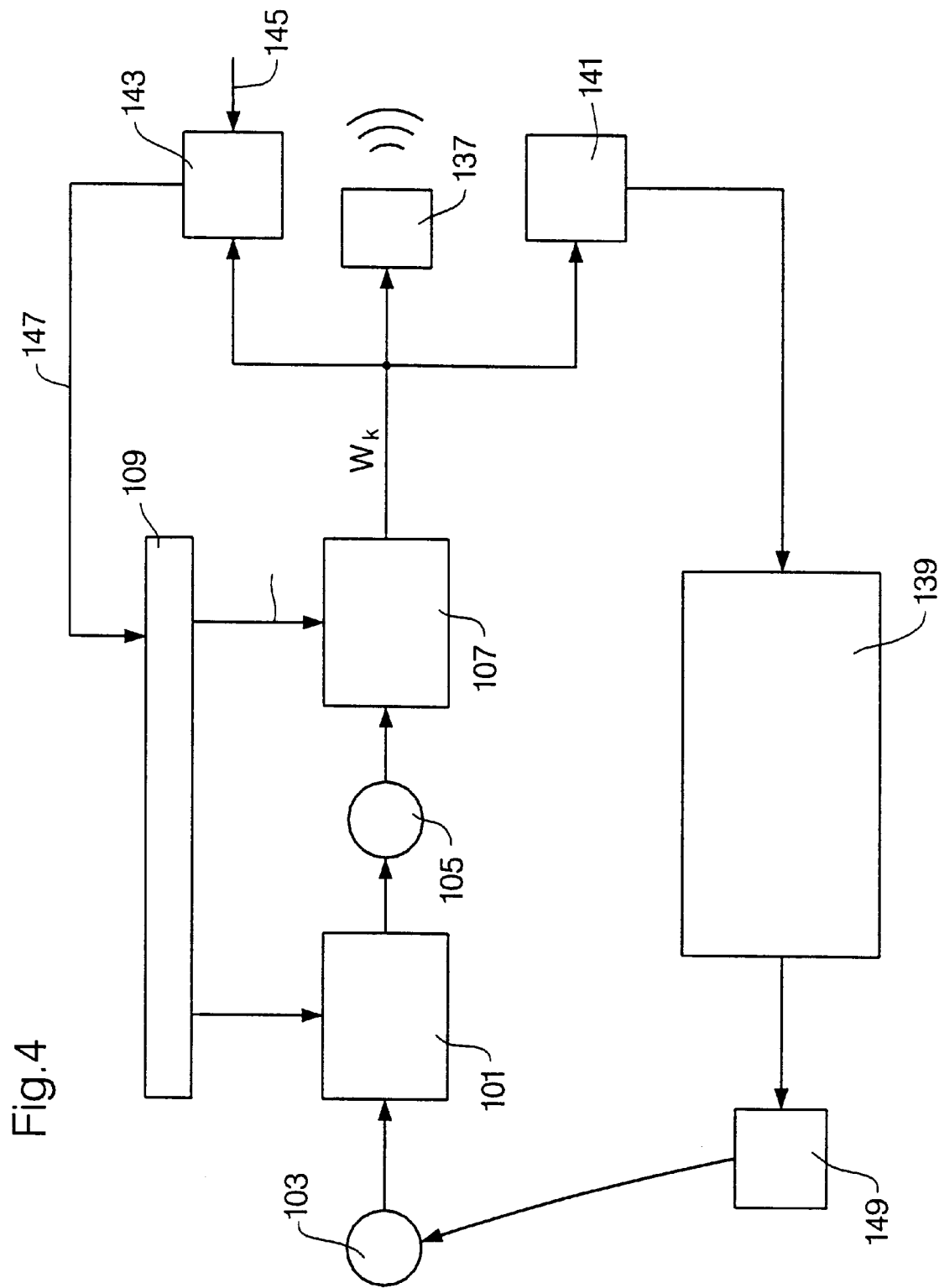
FIG. 4 shows a schematic representation of a further form of execution of the machine diagnosis system according to the invention.

In FIG. 4 there is represented a further form of execution of the machine diagnosis system according to the invention, in which the elements corresponding to the form of execution of FIG. 1 have the same reference numbers as in FIG. 1, increased by the number 100. For the explanation of these elements, reference is made to the description for FIG. 1.

The probability $W_k$ calculated by the cause module 107 for the presence of the cause k is transferred from the cause module 107 to a warning module 137, which notifies or warns the operating personnel of a machine 139 to be diagnosed in the presence of a certain cause probability $W_k$ or also of a certain distribution of cause probabilities. In a corresponding manner the cause probabilities $W_k$ can also be transferred to a reaction module 141, which in the given case can automatically intervene in the operation of the machine 139.

The cause probabilities can further be presented to an expert editor 143 who not only informs the diagnosis expert about the state of the machine 139 but also gives him the possibility represented by the arrow 145 to complete or to modify the machine diagnosis system. For this, for example, a connection to the knowledge basis 109, represented by the connecting line 147, is advantageous. In this manner there can enter into the knowledge-basis 109 not only the experience and the machine understanding of the machine manufacturer, but also the experience of the machine operator gained in the course of the operation. The expert editor 143 also permits, besides, the representation of intermediate results used for the determination of the individual characteristic values, in order to make possible for the diagnosis expert a monitoring of the machine diagnosis system itself.

The form of execution of FIG. 4 has, further, a measurement value detection module 149 which transfers measurement values 103 measured on the machine 139, for example a hydraulic flow machine, to the characteristic value module 101.

What is claimed is:

1. Machine diagnosis system for state-oriented operation monitoring of a machine, comprising:
   a characteristic value module which, proceeding from machine state-related measurement values, forms diagnosis-relevant characteristic values that are linked to operating parameters; and
   a cause module which, from the characteristic values, diagnoses a cause for the detected measurement values, wherein the cause module, for at least one possible cause in each case, calculates a cause probability with the aid of at least one probability-characteristic value relation described by a polygonal course, which indicates with what probability the corresponding cause is responsible for the presence of the detected measurement values.

2. Machine diagnosis system according to claim 1, wherein the cause module for the calculation of the cause probability, calls upon, besides individual characteristic values, at least one characteristic value linkage described by a function of a t least two of the characteristic values that have cross-linked causal interconnections between them.

3. Machine diagnosis system according to claim 1, wherein the cause module calculates the cause probability as a weighted arithmetic mean of individual probabilities, in which the individual probabilities are allocated to individual characteristic values or to characteristic value linkages and, for the mean value formation, are weighted with individual weighting factors.

4. Machine diagnosis system according to claim 3, wherein the individual weighting factors are influenced by characteristic values.

5. Machine diagnosis system according to claim 1, wherein the characteristic value module forms characteristic values dependent on operating parameters and that the cause module draws upon the dependence of the characteristic values or of characteristic value linkages of the operating parameters for the calculation of the cause probability.

6. Machine diagnosis system according to claim 5, wherein the characteristic values or characteristic value linkages are time-dependent, and wherein the characteristic value module assigns the characteristic values or characteristic value linkages to certain operating parameter intervals in order to form characteristic value-operating parameter histograms.

7. Machine diagnosis system according to claim 1, wherein the machine is a rotating hydraulic flow machine, the oscillations of which are to be diagnosed.

8. Machine diagnosis system according to claim 1, wherein the at least one polygonal course is established by a plurality of number pairs stored in a knowledge basis.

9. Machine diagnosis system according to claim 7, wherein the spectral constituents of at least one of shaft oscillations, orbit-characteristics of the shaft oscillations, and phase angles of the shaft oscillations are characteristic values.

10. Machine diagnosis system according to claim 5, wherein an operating parameter is processed, which clearly indicates the momentary operation type, namely whether one of a pump operation, a turbine operation, a phase shifter operation, a starting of the machine, and a running-down of the machine is present.

11. Machine diagnosis system according to claim 5, wherein at least one of momentary performance of the machine, suction tube pressure, tube track pressure, guide wheel position, and drop height of the hydraulic flow machine, is an operating parameter.

12. Machine diagnosis system according to claim 1, wherein a warning module warns the machine operator on presence of a certain cause probability or of a certain distribution of cause probabilities.

13. Machine diagnosis system according to claim 1, wherein a reaction module on presence of a certain cause probability or of a certain distribution of cause probabilities can interfere into the operation of the machine.

14. Machine diagnosis system according to claim 1, wherein the calculation of the cause probability by the cause module proceeds from a knowledge-basis which comprises machine-individual experience knowledge and a theoretical machine model.

15. Machine diagnosis system according to claim 1, wherein the characteristic value module for the formation of the characteristic values proceeds from a knowledge-basis, which comprises machine-individual experience knowledge and a theoretical machine model.

16. Machine diagnosis system according to claim 1, wherein the knowledge-basis is extensible or modifiable by the experience of the machine operator.

17. Process for diagnosing the state-oriented operation monitoring of a machine, comprising:
  forming diagnosis-relevant characteristic values that are linked to operating parameters from machine state-referenced measurement values; and
  diagnosing a cause for the detected measurement values from the characteristic values;
  further comprising for at least one possible cause in each case,
    calculating a cause probability with the aid of at least one probability-characteristic value relation described by a polygonal course, which indicates with what probability the corresponding cause is responsible for the presence of the detected measurement values.

18. Process according to claim 17, wherein for the calculation of the cause probability, besides individual characteristic values, at least one characteristic value linkage is drawn upon, the characteristic value linkage being described by a function of at least two of the characteristic values that have cross-linked causal interconnections between them.

19. Process according to claim 17, wherein the cause probability is calculated as weighted arithmetic mean of individual probabilities, in which the individual probabilities allocated to individual characteristic values or characteristic value linkages are weighted for mean value formation with individual knowledge-based weighting factors.

20. Process according to claim 19, wherein the mean value formation occurs with characteristic value-influenced weighting factors.

21. Process according to claim 17, further comprising:
  forming characteristic values dependent on operating parameters, in which operating parameters are operation type-referred measurement values, and
  drawing upon the dependence of the characteristic values or characteristic value linkages by the operating parameters for the calculation of the cause probability.

22. Process according to claim 21, wherein the characteristic values or characteristic value linkages are time-dependent, and wherein the characteristic values or characteristic value linkages are allocated to certain operating parameter intervals in order to form characteristic value-operating parameter histograms.

23. Process according to claim 17, wherein the machine is a rotating hydraulic flow machine, the oscillations of which are to be diagnosed.

24. Process according to claim 1, wherein the at least one polygonal course is established by a plurality of number pairs stored in a knowledge basis.

25. Process according to claim 23, wherein at least one of the spectral constituents of shaft oscillations, orbit characteristics of the shaft oscillations, and phase angles of the shaft oscillations are characteristic values.

26. Process according to claim 21, wherein an operating parameter is used which indicates whether one of a pump operation, a turbine operation, a phase shifter operation, a starting of the machine, and a running-down of the machine is present.

27. Process according to claim 21, wherein at least one of momentary performance of the machine, suction tube pressure, pipe track pressure, guide wheel position, and fall height of the hydraulic flow machine, is used as operating parameter.

28. Process according to claim 17, wherein on presence of a certain cause probability or of a certain distribution of cause probabilities, the machine operator is warned.

29. Process according to claim 17, wherein on presence of a certain cause probability or of a certain distribution of cause probabilities, it is possible to intervene in the operation of the machine.

30. Process according to claim 17, wherein the calculation of the cause probability proceeds from a knowledge-basis which comprises machine-individual experience knowledge and a theoretical machine model.

31. Process according to claim 17, wherein the formation of the characteristic values proceeds from a knowledge basis which comprises machine-individual experience knowledge and a theoretical machine model.

32. Process according to claim 30, wherein the machine operator can extend or modify the knowledge basis with his rules.

* * * * *